(12) United States Patent
Hosoi

(10) Patent No.: US 7,289,432 B2
(45) Date of Patent: Oct. 30, 2007

(54) HIGH SPEED SWITCHING ROUTER USING APS AND METHOD FOR SWITCHING THE SAME

(75) Inventor: Norikatsu Hosoi, Tokyo (JP)

(73) Assignee: NEC Corporation, Tokyo (JP)

(*) Notice: Subject to any disclaimer, the term of this patent is extended or adjusted under 35 U.S.C. 154(b) by 1005 days.

(21) Appl. No.: 10/370,584

(22) Filed: Feb. 24, 2003

(65) Prior Publication Data
US 2003/0161262 A1 Aug. 28, 2003

(30) Foreign Application Priority Data
Feb. 26, 2002 (JP) .............................. 2002-050396

(51) Int. Cl.
*H04J 1/16* (2006.01)
(52) U.S. Cl. ........................................ 370/218; 370/220
(58) Field of Classification Search ...................... None
See application file for complete search history.

(56) References Cited

U.S. PATENT DOCUMENTS

| | | | |
|---|---|---|---|
| 6,654,923 B1* | 11/2003 | Grenier et al. ............. | 714/752 |
| 6,768,745 B1* | 7/2004 | Gorshe et al. ............. | 370/421 |
| 7,039,005 B2* | 5/2006 | Jenq et al. ................. | 370/217 |
| 7,065,038 B1* | 6/2006 | Brandt et al. ............... | 370/219 |
| 7,102,995 B2* | 9/2006 | Gonda ......................... | 370/224 |
| 7,158,477 B2* | 1/2007 | Fatica et al. ............... | 370/216 |
| 2002/0009048 A1* | 1/2002 | Hosler et al. .............. | 370/217 |
| 2003/0043736 A1* | 3/2003 | Gonda ......................... | 370/218 |
| 2003/0161260 A1* | 8/2003 | Murugan ..................... | 370/217 |

FOREIGN PATENT DOCUMENTS

| | | |
|---|---|---|
| JP | 4-58636 | 2/1992 |
| JP | 7-226729 | 8/1995 |
| JP | 9-74412 | 3/1997 |
| JP | 11-331170 | 11/1999 |
| JP | 2000-151607 | 5/2000 |

* cited by examiner

*Primary Examiner*—Andrew C. Lee
(74) *Attorney, Agent, or Firm*—Young & Thompson

(57) ABSTRACT

In a method of switching a current use communication line between first and second communication lines provided between first and second units, link data is previously held in a first physical interface for the first communication line as the current use communication line and a second physical interface for the second communication line. The current use communication line is switched from the first communication line to the second communication line when a fault is detected in relation to the first communication line. The second communication line is established as the current use communication line for data transfer between the first and second units based on the link data.

9 Claims, 4 Drawing Sheets

HIGH SPEED SWITCHING ROUTER USING APS AND METHOD FOR SWITCHING THE SAME

BACKGROUND OF THE INVENTION

1. Field of the Invention

The present invention relates to a high-speed switching router using an APS (Automatic Protection Switching) and a high-speed switching method of a communication line in the same.

2. Description of the Related Art

A conventional high-speed switching router using an APS has a POS (Packet over SONET/SDH) interface. There are two conventional methods in a fault avoidance routing function using APS (1+1) method in SONET (Synchronous Optical Network)/SDH (Synchronous Digital Hierarchy) in the conventional router. That is, in one conventional method, the ASP is operated by combining two routers as shown in FIG. 1, and in the other conventional method, the APS is operated in one router as shown in FIGS. 2A and 2B.

In conjunction with the above description, Japanese Laid Open Patent Application (JP-A-Heisei 11-331170) is known as a first conventional example. In this first conventional example, a current use system link and a stand-by system link for the backup of the current use system link are provided, and optical transmitter and receiver and an optical cable are duplicated in an ATM interface card. With this structure, only a physical link is duplicated and is connected with an ATM switch.

In the above structure, when an ATM cell is received, whether the ATM cell is received via a current use system ATM switch or a stand-by system ATM switch is checked. When it is determined that the ATM cell is received via the stand-by system link, serial data received by an optical receiver is returned by a selecting section not to receive the ATM cell. The first conventional example says that the duplication of the ATM interface card is unnecessary, resulting in reduction of cost of the apparatus.

However, the above conventional IP router with the line fault avoidance routing function using the APS in SONET/SDH, a 2-link PPP (Point to Point Protocol) is used. The switching using the APS in the SONET/SDH is carried out as an fault avoidance routing operation of an ordinary rate in the IP router. Therefore, the high-speed switching in the SONET/SDH is not utilized sufficiently.

The PPP link in the POS is used for every one physical interface in the above two conventional methods. In case of the APS (1+1) method, the two PPP links exist. For this reason, because an IP address on the router ground side is changed in the APS switching on fault detection, IPCP (Internet Protocol Control Protocol) of the PPP needs re-negotiation. Also, the routing re-calculation is necessary because of the address change. Therefore, it takes a long time until IP Packets can be transmitted once again after APS switching.

Also, a communication path duplication control system is disclosed in Japanese Laid Open Patent Application (JP-A-Heisei 4-58636). In this conventional example, the system is composed of a communication control section which switches between two communication paths. A communication monitoring section monitors the communication paths. Management data is provided to manage each of the communication paths between two transmission apparatuses in units of transmission apparatuses. The two transmission apparatuses are shared by the communication control section and the communication monitoring section. When a current communication state is different from that shown by the management data, the management data is updated by the communication control section or the communication monitoring section. Then, the path is switched in units of transmission apparatuses based on the updated management data.

Also, a line switching control system is disclosed in Japanese Laid Open Patent Application (JP-A-Heisei 7-226729). In this conventional example, an inserting section is provided for each of transmission units to insert fault data in main signals on a current use path and a stand-by path. The fault data shows the existence or non-existence of a fault in a transmission section of each transmission unit. An extracting section of the transmission unit extracts the fault data. A selection section of the transmission unit selects one of the current use path and stand-by path, which is not related with the fault, based on the extracted fault data, and extracts switching control data from the selected path.

Also, an APS system of an ATM switching network is disclosed in Japanese Laid Open Patent Application (JP-A-Heisei 9-74412). In this conventional example, first and second units are connected by a working line and a protection line. Each of the first and second units is composed of a bridge section, a switch and a control section. The bridge section bridges the working line and the protection line on a transmission side. The switch selects one of the working line and the protection line on a receiving side. The control section generates K byte data for realizing APS, receives the K byte data from the protection line, analyzes the K byte data. The control section adds predetermined data to the K byte data and controls the switch to carry out the switching operation.

SUMMARY OF THE INVENTION

Therefore, an object of the present invention is to provide a high-speed switching router using APS, in which high-speed switching is effectively utilized, and a method of a high-speed fault switching of a communication line in the same.

In an aspect of the present invention, a method of switching a current use communication line between first and second communication lines provided between first and second units, is achieved by (a) holding link data previously in a first physical interface for the first communication line as the current use communication line and a second physical interface for the second communication line; by (b) switching the current use communication line from the first communication line to the second communication line when a fault is detected in relation to the first communication line; and by (c) establishing the second communication line as the current use communication line for data transfer between the first and second units based on the link data.

Here, the (a) holding step is achieved by negotiating between the first and second units to generate the link data; by holding the link data previously in the first physical interface for the first communication line as the current use communication line; and by copying the link data from the first physical interface into the second physical interface such that the link data is held by the second physical interface.

Also, one address is desirably allocated to the first physical interface and the second physical interface.

Also, the first unit may be a router using APS (Automatic Protection Switching), and the second unit may be a SONET (Synchronous Optical Network)/SDH (Synchronous Digital Hierarchy) transmission apparatus. In this case, the physical interfaces may be POS (Packet over SONET/SDH) interfaces, and the negotiation is PPP (Point to Point Protocol) negotiation.

In another aspect of the present invention, a router includes a first physical interface which is provided for a first communication line as a current use communication line and which holds link data; and a second physical interface which is provided for a second communication line and which holds the link data. The current use communication line is switched from the first communication line to the second communication line when a fault is detected in relation to the first communication line. The second communication line is established as the current use communication line based on the link data for data transfer.

Here, one address is desirably allocated to the first physical interface and the second physical interface.

Also, the router are connected with a transmission unit by the first and second communication lines. The router negotiates with the transmission unit using the first communication lines and generates the link data indicative of the negotiation result. The first physical interface copies the link data into the second physical interface.

Also, the uses APS (Automatic Protection Switching), and the transmission unit is a SONET (Synchronous Optical Network)/SDH (Synchronous Digital Hierarchy) transmission apparatus.

Also, the physical interface is a POS (Packet over SONET/SDH) interface, and the negotiation is PPP (Point to Point Protocol) negotiation.

In another aspect of the present invention, a recording medium is provided in which a program is recorded for a method of switching a current use communication line between first and second communication lines provided between first and second units. The method is achieved by (a) holding link data previously in a first physical interface for the first communication line as the current use communication line and a second physical interface for the second communication line; by (b) switching the current use communication line from the first communication line to the second communication line when a fault is detected in relation to the first communication line; and by (c) establishing the second communication line as the current use communication line for data transfer between the first and second units based on the link data.

Here, the (a) holding step is achieved by negotiating between the first and second units to generate the link data; by holding the link data previously in the first physical interface for the first communication line as the current use communication line; and by copying the link data from the first physical interface into the second physical interface such that the link data is held by the second physical interface.

Also, one address is desirably allocated to the first physical interface and the second physical interface.

Also, the first unit may be a router using APS (Automatic Protection Switching), and the second unit may be a SONET (Synchronous Optical Network)/SDH (Synchronous Digital Hierarchy) transmission apparatus. In this case, the physical interfaces may be POS (Packet over SONET/SDH) interfaces, and the negotiation is PPP (Point to Point Protocol) negotiation.

DESCRIPTION OF THE PREFERRED EMBODIMENTS

Figure 1:
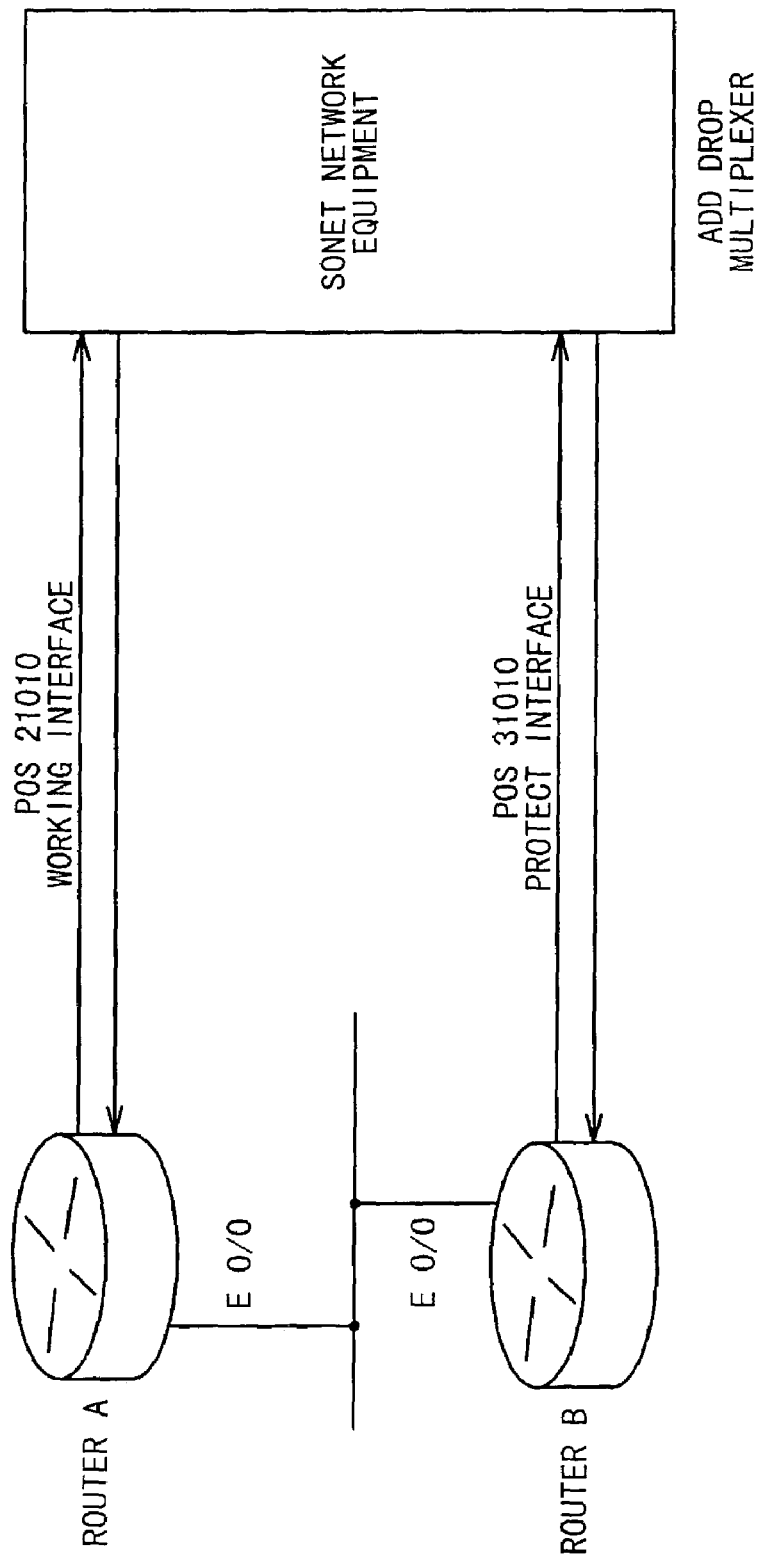
FIG. 1 is a block diagram showing an conventional example.
Figure 2A:
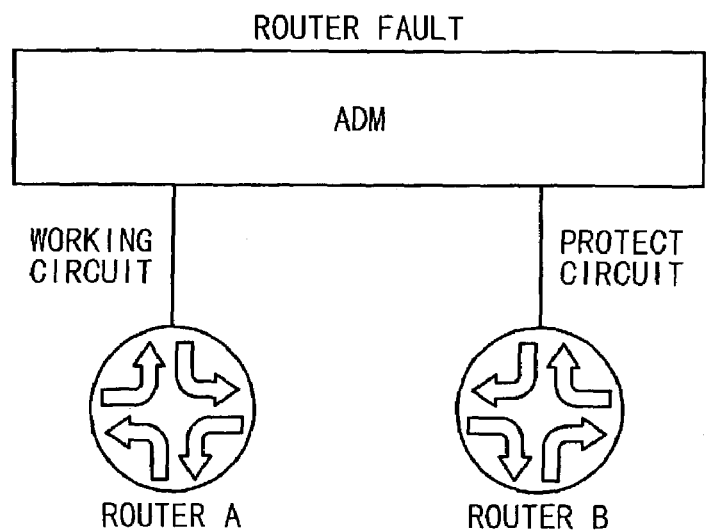
FIGS. 2A and 2B are diagrams showing other conventional examples.
Figure 2B:
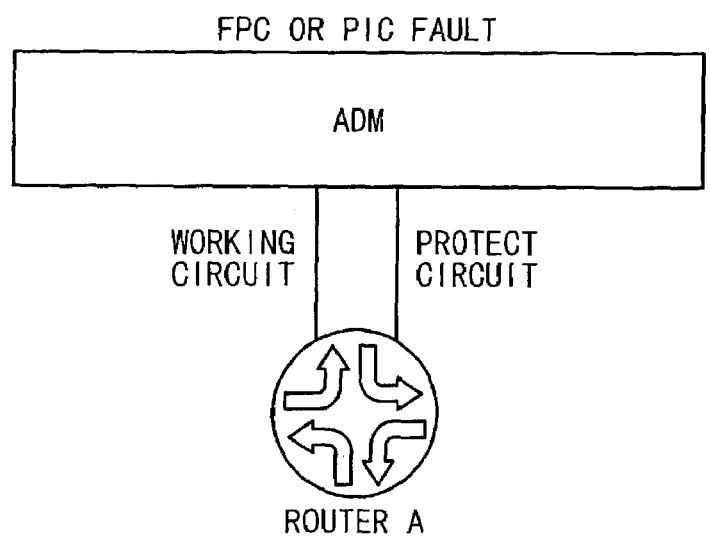
Figure 3:
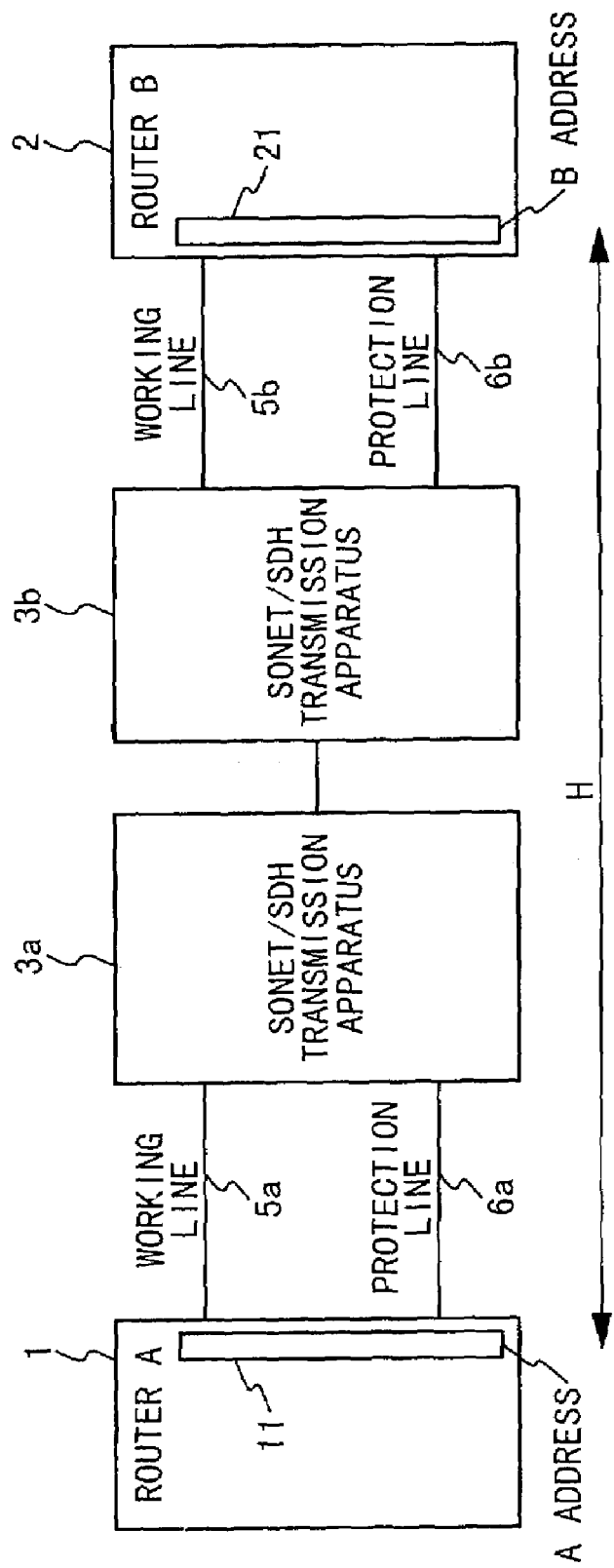
FIG. 3 is a block diagram showing the structure of a high-speed switching router using APS according to an embodiment of the present invention.
Figure 4:
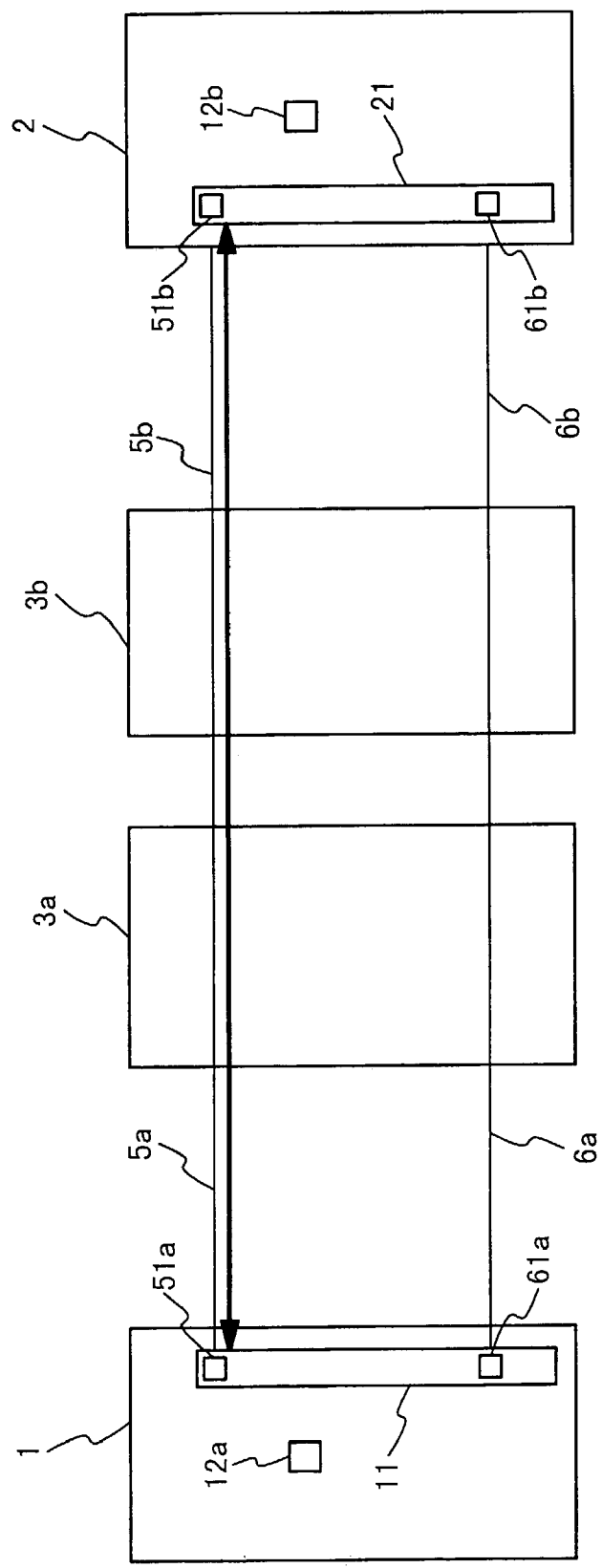
FIG. 4 is a diagram showing an operation example of the high-speed switching router using APS according to the embodiment of the present invention.

Hereinafter, a high-speed switching router using APS of the present invention will be described in detail with reference to the attached drawings. FIGS. 3 and 4 show a system using the high-speed switching router using APS of the present invention.

In the high-speed switching router using APS of the present invention, two POS (Packet over SONET/SDH) interfaces using APS (Automatic Protection Switching) (1+1) method are handled as one logical interface. Thus, a high-speed fault avoidance routing function can be realized. In this structure, when the fault avoidance routing function using APS is operated, the IP (Internet Protocol) address is never changed because PPP uses a single link. As a result, because the re-negotiation and the routing re-calculation for IPCP (Internet Protocol Control Protocol) of PPP (Point to Point Protocol) are unnecessary, the high-speed avoidance routing function can be realized.

FIG. 3 shows a communication line structure of the system to which the high-speed switching router using APS according to the embodiment of the present invention is applied. Referring to FIG. 3, the system to which the high-speed switching router using APS is applied is composed of a router A 1, a first SONET/SDH transmission apparatus 3a, a second SONET/SDH transmission apparatus 3b, and a router B 2. The first SONET/SDH transmission apparatus 3a are connected with the router A 1 by a working line 5a and a protection line 6a. The second SONET/SDH transmission apparatus 3b are connected with the router B2 by a working line 5b and a protection line 6b. The transmission apparatus 3a and the transmission apparatus 3b are connected with an optional transmission line.

The router A 1 has a working line physical interface 51a, a protection line physical interface 61a and a control section 12a. The working line physical interface 51a and the protection line physical interface 61a are handled as one logical interface 11a, and allocated with one IP address. The router B 2 has a working line physical interface 51b, a protection line physical interface 61b and a control unit 12b. The working line physical interface 51b and the protection line physical interface 61b are handled as one logical interface 11b, and allocated with one IP address which is different from the above IP address. A PPP link is formed in the interval H between the logical interface 11a and the logical interface 11b.

As shown in FIG. 3, in the present invention, the two physical interfaces using the APS (1+1) method are handled as the one logic interface. An APS signal of the APS (1+1) method is transmitted and received between the router A 1 and the SONET/SDH transmission apparatus 3a and between the router B 2 and the SONET/SDH transmission apparatus 3b in the SONET/SDH layer to detect a fault in the SONET/SDH layer. Then, when the fault is detected, an alarm is transferred to the control section 12a or 12b and a switching operation is carried out.

On the other hand, one PPP link is formed between the routers A 1 and B 2 opposing in the IP layer for a current use system line and a stand-by system line.

FIG. 4 is a diagram showing the system to which the high-speed switching router according to the embodiment of the present invention.

In the router 1, two physical interfaces 51*a* and 61*a* as POS interfaces are operated in accordance with the APS (1+1) method. The two physical interfaces 51*a* and 61*a* are recognized as one logical interface 11. The working line physical interface 51*a* is connected with the SONET/SDH transmission apparatus 3*a* by the working line 5*a*. The protection line physical interface 61*a* is connected with the SONET/SDH transmission apparatus 3*a* by the protection line 6*a*. With the router B 2 and the SONET/SDH transmission apparatus 3*b,* the above is same. The router 1 and the SONET/SDH transmission apparatus 3*a* and the route 2 and the SONET/SDH transmission apparatus 3*b* operate in accordance with the APS (1+1) method and function as opposing apparatuses in the SONET/SDH layer.

Next, an operation of the high-speed switching router using APS will be described. In the first stage in which a normal connection is assumed, a normal operation is started in accordance with the following procedure.

At a first step, one IP address is given to the router logic interface 11*a* by the control section 12*a*.

At a second step, the working line physical interface 51*a* carries out the negotiation of PPP link through the working line 5*a* using the IP address given to the router logic interface 11*a*.

At a third step, after connection completion as the result of the negotiation of PPP link, link data indicative of the PPP negotiation result is generated and held by the working line physical interface 51*a*. Then, the control section 12*a* controls the working line physical interface 51*a* and the protection line physical interface 61*a* such that the link data is copied from the working line physical interface 51*a* into the protection line physical interface 61*a*. Thus, the same link data are held by the working line physical interface 51*a* and the protection line physical interface 61*a*.

In the second stage in which a fault occurrence is assumed, it supposed that a fault is detected in the working line physical interface 51*a*.

At an eleventh step, when the fault is detected in the working line physical interface 51*a*, a switching operation from the working line physical interface 51*a* to the protection line physical interface 61*a* is carried out in the SONET/SDH layer using APS.

At this time, the PPP link data immediately before the fault is detected by the working line physical interface 51*a* is present in the protection line physical interface 61*a,* regardless of the switching operation completion. Therefore, at a twelfth step, the IP transfer operation can be restarted in the PPP connection state without carrying out PPP negotiation newly.

In this way, since the PPP state does not change, the changes of the IP routing state and forwarding state do not occur. Therefore, the stop of the IP transfer can be made short from the fault occurrence to the completion of the switching operation using APS.

As described above, according to the high-speed switching router using the APS of the present invention, one IP address is given to the working line physical interface of the router. After the negotiation of PPP link by the working line physical interface using the IP address, connection is established as the result of the negotiation of PPP link. At this time, the link data of the PPP negotiation result is copied from the working line physical interface into the protection line physical interface. Thus, the PPP link data are held by the working line physical interface and the protection line physical interface. When a fault has occurred in the working line physical interface, a switching operation from the working line to the protection line is carried out using APS in the SONET/SDH layer. In this case, the switching is completed without re-negotiation and route re-calculation. Therefore, the stop time of the IP transfer can be made short, and a high-speed switching operation is possible.

It should be noted that the above-mentioned embodiment is only one example of the present invention. The present invention is not limited to this, and various modification are possible in the scope which does not deviate from the spirit of the present invention. For example, the above-mentioned embodiment is made on the POS communication line. However, the same effect can be attained by applying the idea of the logic interface to an ATM (asynchronous transfer mode) line.

As described above, according to the present invention, the routing re-calculation is not necessary in case of the fault. Therefore, the stop time of the IP transfer from the fault occurrence to the switching completion can be made short. Also, the re-negotiation for the PPP state is not necessary in case of the fault. Therefore, a high-speed switching operation is possible. In addition, the number of IP addresses used in PPP can be reduced to a half, compared with the conventional method.

What is claimed is:

1. A method of switching a current use communication line between first and second communication lines provided between first and second units, comprising the steps of:
    negotiating between said first and second units to generate link data;
    holding said link data previously in a first physical interface for said first communication line as said current use communication line;
    copying said link data from said first physical interface into a second physical interface such that said link data is held by said second physical interface for said second communication line;
    switching said current use communication line from said first communication line to said second communication line when a fault is detected in relation to said first communication line; and
    establishing said second communication line as said current use communication line for data transfer between said first and second units based on said link data;
    wherein said physical interfaces are POS (Packet over SONET/SDH) interfaces, and the negotiation is PPP (Point to Point Protocol) negotiation.

2. The method according to claim 1, wherein one IP address is allocated to both said first physical interface and said second physical interface.

3. The method according to claim 1, wherein said first unit is a router using APS (Automatic Protection Switching) and said second unit is a SONET (Synchronous Optical Network)/SDH (Synchronous Digital Hierarchy) transmission apparatus.

4. A router comprising:
    a first physical interface which is provided for a first communication line as a current use communication line and which holds link data;
    a second physical interface which is provided for a second communication line and which holds said link data; and
    a transmission unit connected to the router by the first and second communication lines;

wherein said router negotiates with said transmission unit using said first communication lines and generates said link data indicative of the negotiation result; and said first physical interface copies said link data into said second physical interface;

wherein said current use communication line is switched from said first communication line to said second communication line when a fault is detected in relation to said first communication line, said second communication line is established as said current use communication line based on said link data for data transfer; and wherein said physical interface is a POS (Packet over SONET/SDH) interface, and the negotiation is PPP (Point to Point Protocol) negotiation.

5. The router according to claim 4, wherein one IP address is allocated to both said first physical interface and said second physical interface.

6. The router according to claim 4, wherein said uses APS (Automatic Protection Switching), and said transmission unit is a SONET (Synchronous Optical Network)/SDH (Synchronous Digital Hierarchy) transmission apparatus.

7. A computer readable medium in which a program is recorded for a method of switching a current use communication line between first and second communication lines provided between first and second units, wherein said method comprises the steps of:

negotiating between said first and second units to generate link data;

holding said link data previously in a first physical interface for said first communication line as said current use communication line;

copying said link data from said first physical interface into a second physical interface such that said link data is held by said second physical interface for said second communication line;

switching said current use communication line from said first communication line to said second communication line when a fault is detected in relation to said first communication line; and establishing said second communication line as said current use communication line for data transfer between said first and second units based on said link data;

wherein said physical interfaces are POS (Packet over SONET/SDH) interfaces, and the negotiation is PPP (Point to Point Protocol) negotiation.

8. The recording medium according to claim 7, wherein one IP address is allocated to both said first physical interface and said second physical interface.

9. The recording medium according to claim 7, wherein said first unit is a router using APS (Automatic Protection Switching) and said second unit is a SONET (Synchronous Optical Network)/SDH(Synchronous Digital Hierarchy) transmission apparatus.

* * * * *